（12） United States Patent
Ahn et al.

(10) Patent No.: US 11,772,579 B2
(45) Date of Patent: Oct. 3, 2023

(54) DUST COVER FOR A STEERING APPARATUS OF A VEHICLE

(71) Applicants: HYUNDAI MOTOR COMPANY, Seoul (KR); KIA MOTORS CORPORATION, Seoul (KR)

(72) Inventors: Hyoung Jun Ahn, Daegu (KR); Sang Hyun Sim, Hanam-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 520 days.

(21) Appl. No.: 17/025,567

(22) Filed: Sep. 18, 2020

(65) Prior Publication Data

US 2021/0138977 A1 May 13, 2021

(30) Foreign Application Priority Data

Nov. 12, 2019 (KR) .................. 10-2019-0143910

(51) Int. Cl.
*B60R 13/08* (2006.01)
*B62D 1/187* (2006.01)
(52) U.S. Cl.
CPC .......... *B60R 13/0853* (2013.01); *B62D 1/187* (2013.01)

(58) Field of Classification Search
CPC ............................ B60R 13/0853; B62D 1/187
USPC .............................. 180/84; 280/779; 277/604
See application file for complete search history.

(56) References Cited

U.S. PATENT DOCUMENTS

| | | | | |
|---|---|---|---|---|
| 2,797,955 A | * | 7/1957 | Wilfert | B62D 1/16 280/779 |
| 8,469,399 B2 | * | 6/2013 | Allen | F16J 15/3224 280/779 |
| 11,306,822 B2 | * | 4/2022 | Suzuki | F16J 3/041 |

\* cited by examiner

*Primary Examiner* — Greg Binda
(74) *Attorney, Agent, or Firm* — LEMPIA SUMMERFIELD KATZ LLC (57) ABSTRACT

A dust cover for a steering apparatus of a vehicle includes a first cover coupled to an intermediate shaft in a state in which a bearing member is interposed and fixed to a vehicle body panel. The dust cover also includes a second cover coupled to the intermediate shaft in the state in which the bearing member is interposed and fixed to the vehicle body panel together with the first cover in a state of being bonded to the first cover. A tight contact rib in a long continuous shape along a periphery of the intermediate shaft is formed to protrude from the first cover such that the tight contact rib maintains airtightness between the first cover and the vehicle body panel in a state of being always in a tightly adhered state with the vehicle body panel.

9 Claims, 4 Drawing Sheets

DUST COVER FOR A STEERING APPARATUS OF A VEHICLE

CROSS-REFERENCE TO RELATED APPLICATION

This application claims under 35 U.S.C. § 119(a) the benefit of priority to Korean Patent Application No. 10-2019-0143910 filed on Nov. 12, 2019, the entire contents of which are incorporated herein by reference.

BACKGROUND

(a) Technical Field

The present disclosure relates to a dust cover for a steering apparatus of a vehicle. More particularly, it relates to a dust cover for a steering apparatus of a vehicle, which improves a blocking structure between a vehicle body and a dust cover and further improves sound insulation performance.

(b) Background Art

Generally, a steering column of a vehicle includes a steering shaft with a steering wheel which is mounted on an upper end thereof, an intermediate shaft coupled to a lower end of the steering shaft via a universal joint, a column tube surrounding the steering shaft, an upper bracket coupled to an upper end and a lower end of the column tube to be coupled to a vehicle body, and a dust cover fixed to a vehicle body panel while surrounding a lower bracket and the intermediate shaft.

Among the above components, the dust cover is installed to block noise introduced into an interior of a vehicle through an engine room. The dust cover is fixed to the vehicle body panel through a fixing member such as a bolt or the like in a state of being assembled so as to allow the intermediate shaft to pass through an interior of the dust cover.

The dust cover includes a bearing member fitted to the intermediate shaft, and a rubber member for surrounding an outer circumferential surface of the bearing member.

In this case, the rubber member includes an inner cover coupled to the vehicle body panel while surrounding the bearing member and an outer cover coupled to the vehicle body panel while surrounding the inner cover.

However, the conventional dust cover has problems in that sound insulation performance is poor, and, when the intermediate shaft is bent due to an impact during driving, noise of the engine room is largely introduced into the interior of the vehicle such that interior quietness is degraded.

In addition to the above description, the conventional dust cover has problems in that rotation friction of a shaft may be increased when the shaft is tilted up or down, and noise blocking performance between the dust cover and the vehicle body may be degraded.

SUMMARY OF THE DISCLOSURE

The present disclosure has been made in an effort to solve the above-described problems associated with prior art.

In one aspect, the present disclosure provides a dust cover for a steering apparatus of a vehicle. The dust cover improves a blocking structure between a vehicle body and the dust cover and further improves sound insulation performance.

Objectives of the present disclosure are not limited to the above-described objectives, and other objectives of the present disclosure, not mentioned herein, can be understood by the following description and also should be apparently understood through embodiments of the present disclosure. Further, the objectives of the present disclosure can be implemented described in the appended claims and a combination thereof.

In an embodiment, the present disclosure provides a dust cover for a steering apparatus of a vehicle. The dust cover includes a first cover coupled to an intermediate shaft in a state in which a bearing member is interposed and fixed to a vehicle body panel. The dust cover also includes a second cover coupled to the intermediate shaft in the state in which the bearing member is interposed and fixed to the vehicle body panel together with the first cover in a state of being bonded to the first cover. A tight contact rib in a long continuous shape along a periphery of the intermediate shaft is formed to protrude from the first cover such that the tight contact rib maintains airtightness between the first cover and the vehicle body panel in a state of being always in a tightly adhered state with the vehicle body panel.

Further, in the dust cover for a steering apparatus of a vehicle according to an embodiment of the present disclosure, in a state in which the first cover is coupled to the second cover, a sealed inner space may be formed inside the two covers. The sealed inner space of the two covers may be filled with air such that a sealed air layer area may be provided.

Further, a curtain portion formed to extend from each of inner surfaces of the first cover and the second cover to be in contact with the intermediate shaft to partition an interior of the sealed air layer area may be provided inside the sealed air layer area.

Further, an accommodation portion may be formed in a recessed shape in which the first cover and the second cover are accommodated at the vehicle body panel. The tight contact rib may be formed to protrude from an outer surface of the first cover accommodated in the accommodation portion of the vehicle body panel such that the tight contact rib may be provided to maintain airtightness between the outer surface of the first cover and an inner surface of the accommodation portion.

Further, the tight contact rib may be formed to be elongated in a circular shape along the periphery of the intermediate shaft.

Further, each of the first cover and the second cover may include an outer tube portion in which the tight contact rib is formed, an inner tube portion coupled to the intermediate shaft in a state of interposing a bearing, and a connector formed to connect between the outer tube portion and the inner tube portion.

Further, each of the first cover and the second cover may include a flange portion formed in the outer tube portion. The flange portions of the first cover and the second cover may be fixed to the vehicle body panel in a state of being bonded thereto.

Further, the connector of each of the first cover and the second cover may have a bent cross-sectional shape which is deformable due to a force applied through the inner tube portion in the intermediate shaft.

In the first cover and the second cover, the outer tube portion, the connector, and the inner tube portion may each be provided to have a bent zigzag shape in a cross section such that, when the connector is deformed, a gap between the outer tube portion and the inner tube portion may be adjustable.

Other aspects and embodiments of the present disclosure are discussed below.

It should be understood that the term "vehicle" or "vehicular" or other similar terms as used herein are inclusive of motor vehicles in general. Such motor vehicles may encompass: passenger automobiles including sports utility vehicles (SUV), buses, trucks, and various commercial vehicles; watercraft including a variety of boats and ships; aircraft and the like; and alternative fuel vehicles including hybrid vehicles, electric vehicles, plug-in hybrid electric vehicles, and hydrogen-powered vehicles (e.g. fuels derived from resources other than petroleum). As referred to herein, a hybrid vehicle is a vehicle that has two or more sources of power, for example vehicle that are both gasoline-powered and electric-powered.

The above and other features of the present disclosure are discussed below.

BRIEF DESCRIPTION OF THE DRAWINGS

The above and other features of the present disclosure are described below in detail with reference to certain embodiments thereof illustrated in the accompanying drawings, which are given hereinbelow by way of illustration only, and thus are not limitative of the present disclosure, and wherein.

It should be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes can be determined in part by the particular intended application and use environment.

In the figures, reference numbers refer to the same or equivalent parts of the present disclosure throughout the several figures of the drawing.

DETAILED DESCRIPTION

Embodiments of the present disclosure are described in detail below so that they can be easily practiced by those having ordinary skill in the art to which the present disclosure pertains with reference to the accompanying drawings. However, the present disclosure is not limited to the embodiments disclosed herein and may be implemented in other forms.

Throughout this disclosure, when an element is referred to as "comprising" a component, it refers that the element can further include other components, not excluding the other components unless specifically stated otherwise.

First, in order to help understanding of the present disclosure, a conventional dust cover for a steering apparatus is briefly described below.

Figure 1:
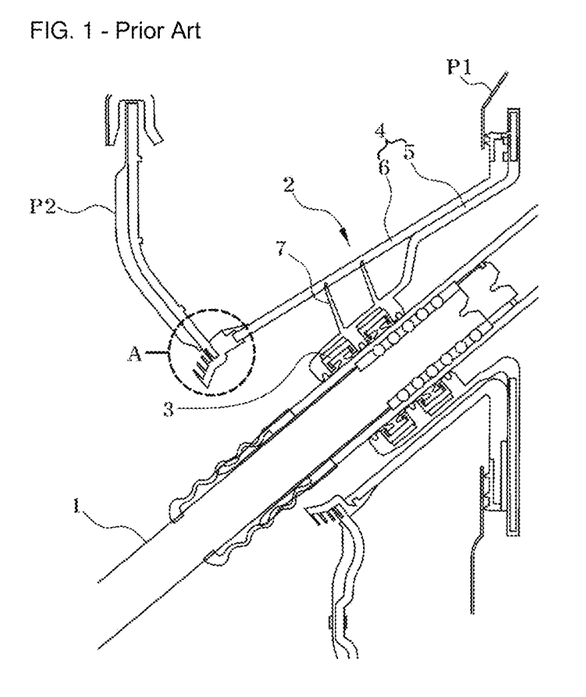
FIG. 1 is a diagram illustrating an example of a dust cover for a steering apparatus according to the related art.

FIG. 1 is a diagram illustrating a dust cover for a steering apparatus of a vehicle according to the related art. FIG. 1 is a cross-sectional view showing a state in which a dust cover 2 is installed at a dash panel P1 and a partition wall panel P2, which are a vehicle body panel, together with an intermediate shaft 1.

The dust cover 2 is installed to block noise introduced into a vehicle interior through an engine room and includes a bearing member 3 fitted to the intermediate shaft 1 and a rubber member 4 surrounding an outer circumferential surface of the bearing member 3.

The rubber member 4 includes an inner cover 5 coupled to the dash panel P1 while surrounding the bearing member 3, and an outer cover 6 coupled to the dash panel P1 and the partition wall panel P2 while surrounding the inner cover 5.

However, according to the conventional dust cover shown in FIG. 1, when a steering column is tilted up and down, the inner cover 5 is pressed by the outer cover 6 such that there may occur a problem in that rotation friction of the intermediate shaft 1 is increased.

Further, as the steering column is tilted up and down, a pressing amount of a rubber membrane curtain 7 is varied between the inner cover 5 and the outer cover 6 such that there may occur a problem in that sound insulation performance becomes different.

This becomes a cause to develop a spacing phenomenon between the inner cover 5 and the outer cover 6. Consequently, when the intermediate shaft 1 is bent due to an impact or the like during driving, noise of the engine room is largely introduced into the vehicle interior such that interior quietness may be degraded.

Figure 2:
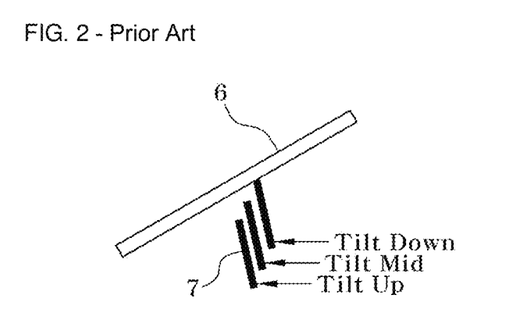
FIG. 2 is a diagram for describing a problem of the dust cover according to the related art.

FIG. 2 illustrates a case in which, when the steering column is tilted up and down, an angle of the intermediate shaft 1 is varied such that an inner surface of the outer cover 6 may be spaced apart from the rubber membrane curtain 7.

Further, according to an assembly state of the partition wall panel P2 and the outer cover 6, a spacing phenomenon may occur between two matching portions (portion A in FIG. 1) such that there may occur a problem in that the sound insulation performance may be degraded.

Figure 3:
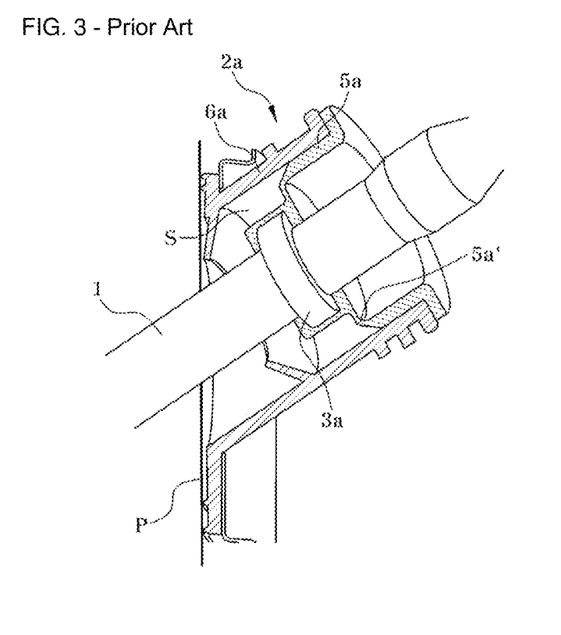
FIG. 3 is a diagram illustrating another example of a dust cover for a steering apparatus according to the related art.

FIG. 3 illustrates another example of the related art. A dust cover 2a shown in FIG. 3 includes an oiless bearing 3a fitted to the intermediate shaft 1, an inner cover 5a coupled to the oiless bearing 3a, and an outer cover 6a coupled to the vehicle body panel P while surrounding the inner cover 5a.

However, since engine noise is resonated in a narrow empty space (see a reference numeral S in FIG. 3) inside the outer cover 6a and amplified and introduced into the vehicle interior, the sound insulation performance of the dust cover 2a shown in FIG. 3 is poor. Also, since a rubber membrane portion 5a' for noise isolation in the inner cover 5a has a single membrane structure, the dust cover 2a has a structure that is very disadvantageous to the sound insulation performance.

Therefore, to solve the above-described conventional problems, the present disclosure discloses a dust cover for a steering apparatus of which a blocking structure and sound insulation performance between a vehicle body and a dust cover are improved.

Hereinafter, examples of the dust cover according to embodiments of the present disclosure are described in detail with reference to the drawings.

Figure 4:
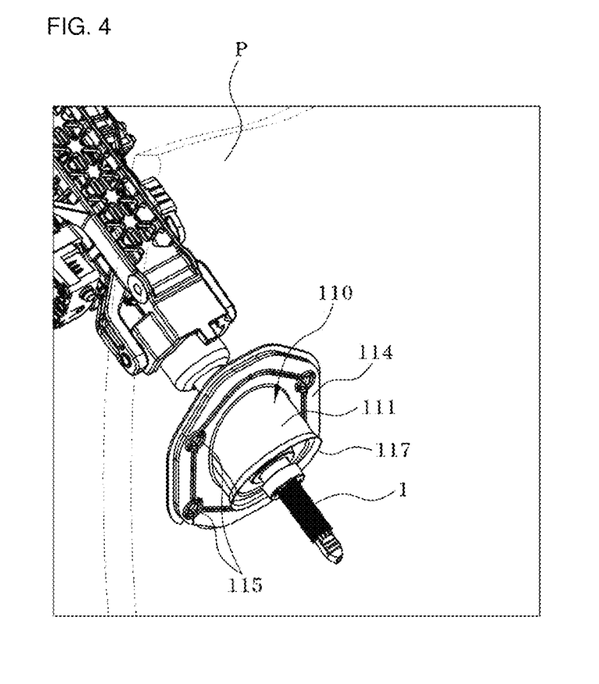
FIG. 4 is a diagram illustrating an installation state of a dust cover according to an embodiment of the present disclosure.
Figure 5:
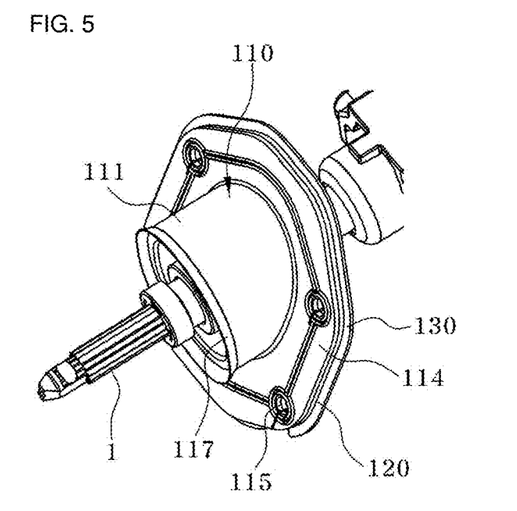
FIG. 5 is a perspective view illustrating a tight contact rib in the dust cover according to an embodiment of the present disclosure.

FIG. 4 is a diagram illustrating an installation state of a dust cover according to an embodiment of the present disclosure. FIG. 5 is a perspective view illustrating a tight contact rib in the dust cover according to an embodiment of the present disclosure.

Figure 6:
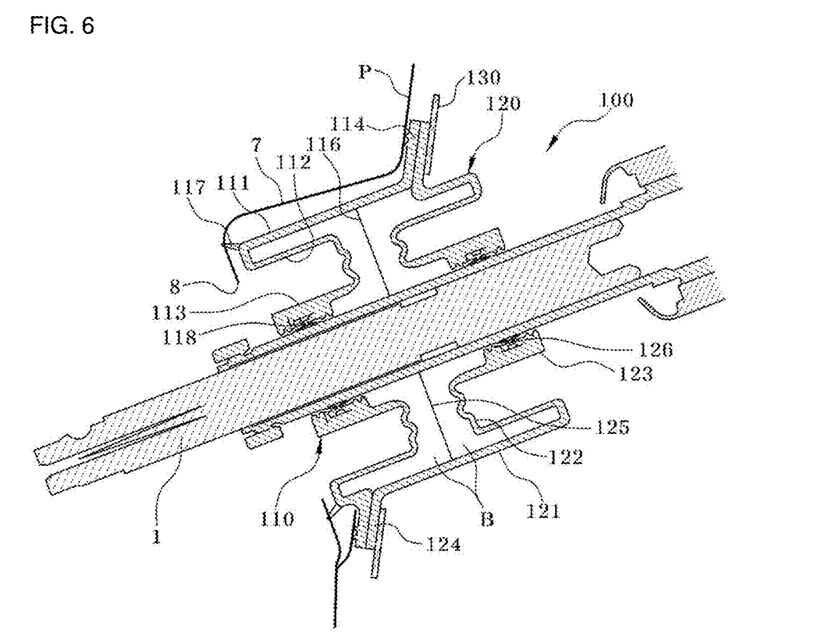
FIG. 6 is a cross-sectional view illustrating a configuration of the dust cover according to an embodiment of the present disclosure.
Figure 7:
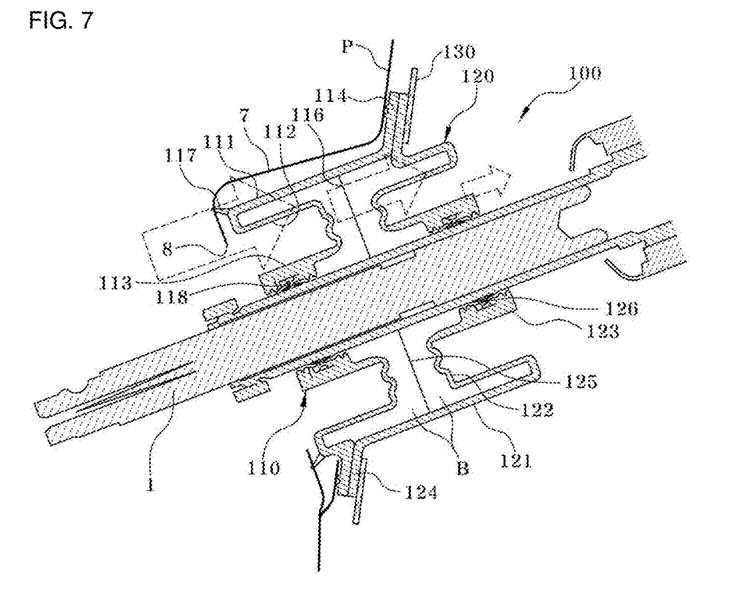
FIG. 7 is a diagram illustrating a noise path and a variation in size in the dust cover according to an embodiment of the present disclosure.

Further, FIG. 6 is a cross-sectional view illustrating a configuration of the dust cover according to an embodiment of the present disclosure. FIG. 7 is a diagram illustrating a noise path and a variation in size in the dust cover according to an embodiment of the present disclosure. In FIG. 7, a magnitude of an arrow indicates a magnitude of noise.

Figure 8:
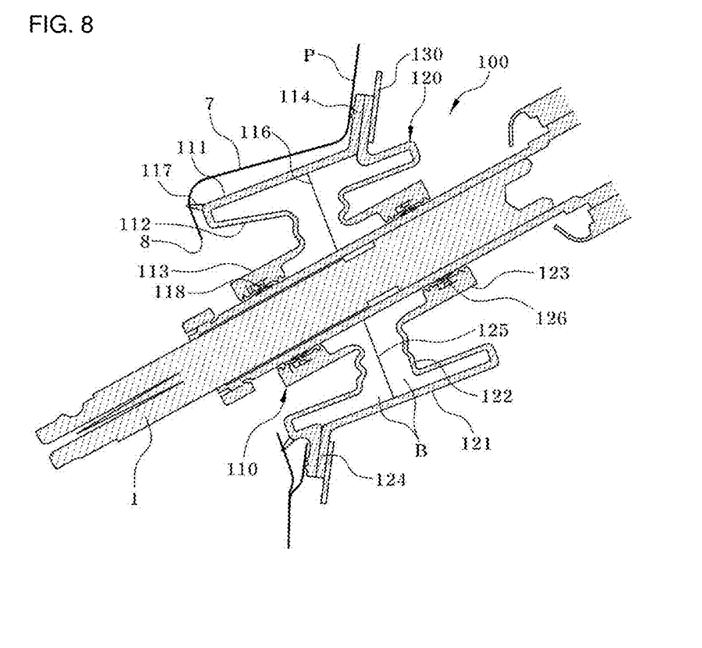
FIG. 8 is a cross-sectional view illustrating a state in which a dust cover is tilted up and down in the dust cover according to an embodiment of the present disclosure.

Further, FIG. 8 is a cross-sectional view illustrating a state in which a steering column is tilted up and down in the dust cover according to an embodiment of the present disclosure.

In a steering apparatus of a vehicle, a lower end portion of a steering column is connected to a gearbox. In this case, the steering column may be connected to the gearbox in the form of being bent at an arbitrary angle in the middle of the steering column instead of a straight line form due to surrounding conditions.

Thus, a steering shaft and an intermediate shaft, which constitute the steering column, are connected via a universal joint. The intermediate shaft is connected to the gearbox through the universal joint in a state of being bent at the steering shaft.

The intermediate shaft is connected between the steering shaft and the gearbox and serves to receive a rotating force of a steering wheel through the steering shaft to transfer the rotating force to the gearbox through the steering shaft.

A dust cover 100 according to an embodiment of the present disclosure is installed between the steering column and a vehicle body and serves to block noise introduced into the vehicle interior from the engine room of the vehicle.

More specifically, as shown in FIG. 4, the dust cover 100 according to an embodiment of the present disclosure is installed between the intermediate shaft 1 of the steering column and a vehicle body panel P. The dust cover 100 is installed and fixed to the vehicle body panel P in a state in which bearing members 118 and 126 are interposed between the intermediate shaft 1 and the dust cover 100. The vehicle body panel P may be a dash panel.

The dust cover 100 according to an embodiment of the present disclosure is mounted on the vehicle body panel P in a state of being coupled to an outer circumference of the intermediate shaft 1. In this case, an accommodation portion 7 on which the dust cover 100 is mounted is formed in the vehicle body panel P in a recessed shape.

As shown in FIG. 8, a hole 8 is formed to pass through one side of the accommodation portion 7 of the vehicle body panel P so as to allow the intermediate shaft 1 to pass through the hole 8. The intermediate shaft 1 in a state of being coupled to the dust cover 100 is disposed to pass through the hole 8 to be placed over a space of the engine room and an interior thereof.

The dust cover 100 according to an embodiment of the present disclosure is configured to definitely block engine noise using a multi-blocking structure while preventing resonance of the engine noise, thereby significantly improving sound insulation performance as compared to the conventional dust cover.

To describe a configuration, as shown in FIG. 6, the dust cover 100 according to an embodiment of the present disclosure includes a first cover 110 and a second cover 120.

Both the first cover 110 and the second cover 120 may be made of rubber. The first cover 110 and the second cover 120 serve to reduce noise when the noise passes therethrough.

The first cover 110 is fixed to the vehicle body panel P together with the second cover 120. A first bearing member 118 is installed inside the first cover 110 to be fitted to the intermediate shaft 1.

In other words, the first bearing member 118 is coupled and installed to an inner tube portion 113 of the first cover 110. A flange portion 114 for engagement with the vehicle body panel P and the second cover 120 is formed in an outer tube portion 111 of the first cover 110 over an entire circumference thereof.

In this case, one surface of the flange portion 114 of the first cover 110 is bonded to the vehicle body panel P in a state in which the other surface of the flange portion 114 thereof is bonded to one surface of a flange portion 124 of the second cover 120, and, in a state in which a steel bracket 130 is additionally bonded to the other surface of the flange portion 124 of the second cover 120. The first cover 110, the second cover 120, and the steel bracket 130 are integrally fixed to the vehicle body panel P through a bolt (not shown) sequentially passing through the flange portions 114 and 124 of the two covers 110 and 120, the steel bracket 130, and the vehicle body panel P, and a nut (not shown) engaged with the bolt.

In FIG. 5, a reference numeral 115 indicates an engagement hole formed in the first cover 110 to allow the bolt, which is a fixing member, to pass therethrough.

FIGS. 6 to 8 illustrate longitudinal cross-sectional shapes of the intermediate shaft 1 and the dust cover 100. When viewed from a longitudinal cross section, the first cover 110 has a structure in which a connector 112 having a bent shape is integrally formed between the outer tube portion 111 and the inner tube portion 113.

In the first cover 110, the outer tube portion 111, the inner tube portion 113, and the connector 112 may each have a circular cross-sectional shape in a transverse cross section of the first cover 110.

As described above, in such a structure, the flange portion 114 is formed in the outer tube portion 111 of the first cover 110 over the entire circumference thereof. The first bearing member 118 interposed between the intermediate shaft 1 and the first cover 110 is coupled to the inner tube portion 113 of the first cover 110.

Further, in the first cover 110, the outer tube portion 111, the connector 112, and the inner tube portion 113 have a zigzag shape in a cross section to form a corrugated structure. The first cover 110 has a structure in which the connector 112 is deformed such that a gap between the outer tube portion 111 and the inner tube portion 113 may be adjusted.

Similar to folding that occurs in a bellows structure having a plurality of corrugations exhibiting a zigzag shape in a cross section, since the outer tube portion 111, the connector 112, and the inner tube portion 113, which exhibit a zigzag shape in a cross section of the first cover 110 of the dust cover 100, form a corrugated structure, when an angle of the intermediate shaft 1 is varied while being tilted up and down and thus a force acts on the connector 112 from the outer tube portion 111 or the inner tube portion 113, the connector 112 may be deformed such that, owing to the deformation, the gap between the inner tube portion 113 and the outer tube portion 111 may be adjusted.

Consequently, even when the angle (inclination angle or inclination) of the intermediate shaft 1 is varied while being tilted up and down, as shown in FIG. 8, the first cover 110 of the dust cover 100 may be always remained in a tightly adhered state with the accommodation portion 7 of the vehicle body panel P.

A second bearing member 126 fitted to the intermediate shaft 1 is installed inside the second cover 120. Like the first cover 110, the second bearing member 126 is coupled to and installed in the inner tube portion 123 of the second cover 120. The flange portion 124 for engagement with the vehicle body panel P and the first cover 110 is formed in the outer tube portion 121 of the second cover 120 over an entire circumference thereof.

Referring to FIG. 6, when viewed from the longitudinal cross section, the second cover 120 has a structure in which a connector 122 having a bent shape is integrally formed between the outer tube portion 121 and the inner tube portion 123. In this case, the outer tube portion 121, the inner tube portion 123, and the connector 122 of the second cover 120 may each have a circular cross-sectional shape in a transverse cross section of the second cover 120.

Further, similar to the first cover 110, the outer tube portion 121, the connector 122, and the inner tube portion 123 of the second cover 120 have a zigzag shape in a cross section to form one kind of a corrugated structure. The second cover 120 has a structure in which the connector 122 is deformed such that a gap between the outer tube portion 121 and the inner tube portion 123 may be adjusted.

In other words, since the outer tube portion 121, the connector 122, and the inner tube portion 123, which exhibit a zigzag shape in a cross section of the second cover 120 of the dust cover 100, form a corrugated structure, when an angle of the intermediate shaft 1 is varied while being tilted up or down and thus a force acts on the connector 122 from the outer tube portion 121 or the inner tube portion 123, the connector 122 may be deformed such that, owing to the deformation, the gap between the inner tube portion 123 and the outer tube portion 121 may be adjusted.

Further, when the flange portion 114 of the first cover 110 and the flange portion 124 of the second cover 120 are engaged with and fixed to the vehicle body panel P in a state in which the flange portion 114 of the first cover 110 is bonded to the flange portion 124 of the second cover 120, the first cover 110 and the second cover 120 form a sealed inner space. The sealed inner space is filled with air such that the dust cover 100 has a predetermined volume of an inner air layer area B formed by which the sealed inner space is filled with the air.

In other words, while tilted up or down, owing to deformation of the first cover 110 and the second cover 120 resulting from structural characteristics thereof, an increase of rotation friction with respect to the intermediate shaft 1 may be prevented. Simultaneously, the same sound insulation performance may be obtained regardless of the tilting up or down.

FIG. 8 illustrates that, even when the angle of the intermediate shaft 1 is varied, the vehicle body panel P and the dust cover 100 may be always maintained in a tightly adhered state due to the deformation of the first cover 110 and the second cover 120.

In the dust cover 100 according to an embodiment of the present disclosure, curtain portions 116 and 125 may further be respectively formed on the first cover 110 and the second cover 120.

The curtain portions 116 and 125 are formed to be located inside the air layer area B. In this case, end portions of the curtain portions 116 and 125 are formed to extend to be in contact with an outer circumferential surface of the intermediate shaft 1, thereby partitioning the sealed air layer area B.

The curtain portions 116 and 125 may serve to block noise inside the air layer area B and reduce noise while the noise passes through the sealed air layer area B and the curtain portions 116 and 125 in the dust cover 100.

In particular, each of the curtain portions 116 and 125 is a thin noise blocking membrane. Even when the curtain portions 116 and 125 are pressed and deformed between the first cover 110, the second cover 120, and the intermediate shaft 1, the pressing deformation of these curtain portions 116 and 125 is independent of a rise of the rotation friction of intermediate shaft 1.

In other words, even when the angle of intermediate shaft 1 is varied while tilted up or down and thus the deformation of the first cover 110 and the second cover 120 occurs, the curtain portions 116 and 125, which are made of rubber and have a membrane structure with a thin thickness, absorb stress through their deformation such that a rise in rotation friction and torque of the intermediate shaft 1 is prevented.

Further, as shown in FIGS. 5 and 6, a tight contact rib 117 has a predetermined thickness and is capable of being always in a tightly adhered state with the vehicle body panel P. The tight contact rib 117 is formed to protrude from the dust cover 100 according to an embodiment of the present disclosure. The tight contact rib 117 serves to block noise and maintain airtightness and watertightness between the dust cover 100 and the vehicle body panel P.

In an embodiment, as shown in FIG. 5, the tight contact rib 117 may be formed in a long continuous shape along a portion spaced apart from an inner surface of the accommodation portion 7 of the vehicle body panel P in the dust cover 100.

In this case, the tight contact rib 117 may be formed in a circular continuous shape along an entire circumference of the intermediate shaft 1 in the dust cover 100. The tight contact rib 117 may be formed in a circular shape along the entire circumference of the intermediate shaft 1 so as to be always in tight contact with the inner surface of the accommodation portion 7 of the vehicle body panel P.

In an embodiment, the tight contact rib 117 may be formed in a long continuous shape along a portion facing the inner surface of the accommodation portion 7 of the vehicle body panel P in the outer tube portion 111 of the first cover 110.

As described above, the tight contact rib 117 is always in contact with the vehicle body panel P and is formed in the dust cover 100 such that a gap may be removed between the inner surface of the accommodation portion 7 of the vehicle body panel P and a surface of the dust cover 100. Further, a noise path between the accommodation portion 7 of the vehicle body panel P and the dust cover 100 may be completely blocked.

Consequently, the dust cover 100 according to an embodiment of the present disclosure has a six-blocked structure which entirely blocks the engine noise and the resonance thereof between the vehicle body panel P and the intermediate shaft 1.

In other words, when the air layer area B sealed in the dust cover 100 is divided into two air layer areas by the curtain portions 116 and 125, the six-blocked structures may be provided by the first cover 110, a first air layer area (partitioned by the curtain portion), the curtain portions 116 and 125, a second air layer area (partitioned by the curtain portion), the second cover 120, and the tight contact rib 117.

Consequently, the engine noise may be significantly reduced while passing through the first cover 110, the first air layer, the curtain portions 116 and 125, the second air layer, and the second cover 120 and blocked by the tight contact rib 117.

Further, in the dust cover 100 according to an embodiment of the present disclosure, the inner air layer area B between the first cover 110 and the second cover 120 has a completely sealed structure. A path between the vehicle body panel P and the dust cover 100 has a structure which is blocked by the tight contact rib 117 such that there is no structure or space in which the noise is amplified.

Further, as shown in FIG. 7, the noise may be significantly reduced while passing through the first cover 110 and the second cover 120, which are made of rubber, the curtain portions 116 and 125, and the sealed air layer area B. An inflow of the noise around the dust cover 100 is prevented by the tight contact rib 117 which maintains a tightly adhered state with the vehicle body such that an effect of the sound insulation may be enhanced.

Further, the tight contact rib 117 is formed on the dust cover 100 to be in contact with the vehicle body panel P such that a phenomenon in which a close contact between the two sides is varied according to an assembly distribution of the vehicle body panel P and the dust cover 100 and a problem due to the phenomenon may be fundamentally prevented.

As described above, in accordance with a dust cover for a steering apparatus of a vehicle according to the present disclosure, a tight contact rib which is always in contact with a vehicle body panel is formed such that a gap between the vehicle body panel and the dust cover can be removed and a noise path between the vehicle body panel and the dust cover can be completely blocked.

Consequently, in the dust cover according to embodiments of the present disclosure, the noise path between the vehicle body panel and the dust cover has a structure which is blocked by the tight contact rib such that there is no structure or space in which noise is amplified, resonance of engine noise can be prevented, and an effect of sound insulation can be maximized.

Further, the tight contact rib is formed on the dust cover to be in contact with the vehicle body panel such that a phenomenon in which a close contact between the two sides is varied according to an assembly distribution of the vehicle body panel and the dust cover and a problem due to the phenomenon may be fundamentally prevented.

As described above, although the embodiments of the present disclosure have been described in detail, the claims of the present disclosure is not limited to the above-described embodiments, and various modifications and improvements by those having ordinary skill in the art using the basic concept of the present disclosure defined in the appended claims can also be included the claims of the present disclosure.

What is claimed is:

1. A dust cover for a steering apparatus of a vehicle, the dust cover comprising:
   a first cover coupled to an intermediate shaft in a state in which a first bearing member is interposed and fixed to a vehicle body panel; and
   a second cover coupled to the intermediate shaft in a state in which a second bearing member is interposed and fixed to the vehicle body panel together with the first cover in a state of being bonded to the first cover,
   wherein a tight contact rib in a long continuous shape along a periphery of the intermediate shaft is formed to protrude from the first cover such that the tight contact rib maintains airtightness between the first cover and the vehicle body panel in a state of being always in a tightly adhered state with the vehicle body panel,
   wherein a curtain portion is formed to extend from each of inner surfaces of the first cover and the second cover to be in contact with the intermediate shaft to partition an interior of a sealed air layer area and is provided inside the sealed air layer area, and the dust cover is configured to have a substantially bilateral symmetric structure with respect to the curtain portion.

2. The dust cover of claim 1, wherein, in a state in which the first cover is coupled to the second cover, a sealed inner space is formed inside the two covers, and wherein the sealed inner space of the two covers is filled with air such that the sealed air layer area is provided.

3. The dust cover of claim 1, wherein:
   an accommodation portion is formed in a recessed shape in which the first cover and the second cover are accommodated at the vehicle body panel; and
   the tight contact rib is formed to protrude from an outer surface of the first cover accommodated in the accommodation portion of the vehicle body panel such that the tight contact rib maintains airtightness between the outer surface of the first cover and an inner surface of the accommodation portion.

4. The dust cover of claim 3, wherein the tight contact rib is formed to be elongated in a circular shape along the periphery of the intermediate shaft.

5. The dust cover of claim 1, wherein each of the first cover and the second cover includes:
   an outer tube portion in which the tight contact rib is formed;
   an inner tube portion coupled to the intermediate shaft in a state of interposing athe first and second bearing members, respectively; and
   a connector formed to connect between the outer tube portion and the inner tube portion.

6. The dust cover of claim 5, wherein each of the first cover and the second cover further includes:
   a flange portion formed in the outer tube portion,
   wherein the flange portions of the first cover and the second cover are fixed to the vehicle body panel in a state of being bonded thereto.

7. The dust cover of claim 5, wherein, in each of the first cover and the second cover, the connector has a bent cross-sectional shape which is deformable due to a force applied through the inner tube portion in the intermediate shaft.

8. The dust cover of claim 5, wherein, in the first cover and the second cover, the outer tube portion, the connector, and the inner tube portion are each provided to have a bent zigzag shape in cross section such that, when the connector is deformed, a gap between the outer tube portion and the inner tube portion is adjustable.

9. A dust cover for a steering apparatus of a vehicle, the dust cover comprising:
   a first cover coupled to an intermediate shaft in a state in which a first bearing member is interposed and fixed to a vehicle body panel; and
   a second cover coupled to the intermediate shaft in a state in which a second bearing member is interposed and fixed to the vehicle body panel together with the first cover in a state of being bonded to the first cover,
   wherein a tight contact rib in a long continuous shape along a periphery of the intermediate shaft is formed to protrude from the first cover such that the tight contact rib maintains airtightness between the first cover and the vehicle body panel in a state of being always in a tightly adhered state with the vehicle body panel, wherein a curtain portion is formed to extend from each of inner surfaces of the first cover and the second cover to be in contact with the intermediate shaft to partition an interior of a sealed air layer area and is provided inside the sealed air layer area, wherein each of the first cover and the second cover includes:
- an outer tube portion in which the tight contact rib is formed;
- an inner tube portion coupled to the intermediate shaft in a state of interposing the first and second bearing members, respectively; and
- a connector formed to connect between the outer tube portion and the inner tube portion, wherein a gap is formed between the outer tube portion and the inner tube portion such that when the connector is deformed, the gap is adjusted, and wherein the dust cover is configured to have a substantially bilateral symmetric structure with respect to the curtain portion..

\* \* \* \* \*